Nov. 26, 1935.  J. C. ADAMS  2,022,531
FUSE FOR AN ELECTRICALLY HEATED DEVICE
Filed June 21, 1933
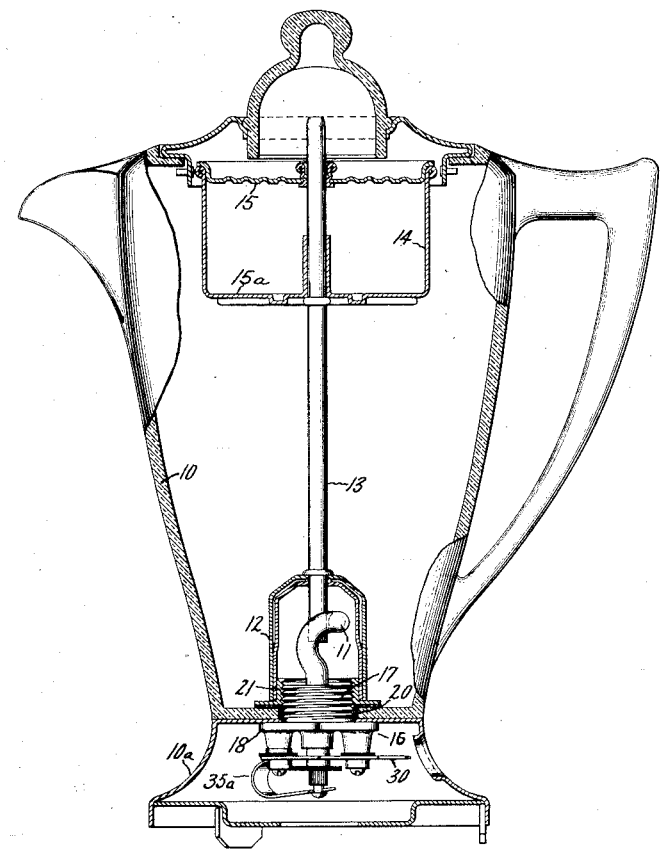
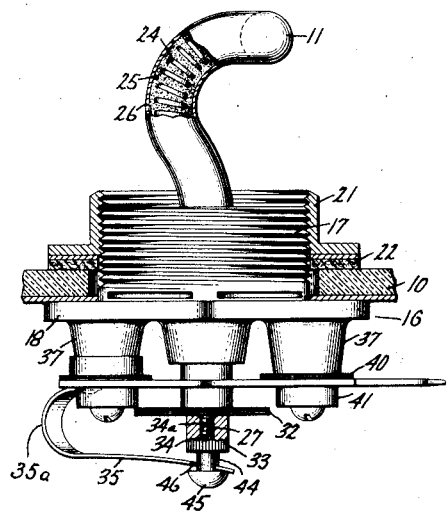
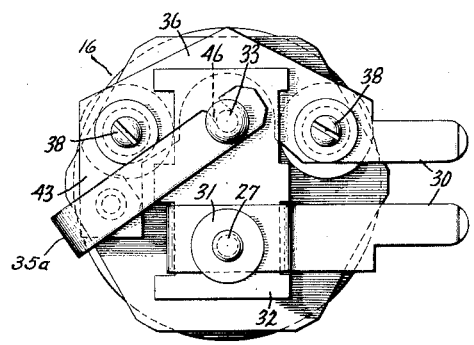
Inventor:
Joy C. Adams,
by Harry E. Dunham
His Attorney.

Patented Nov. 26, 1935

2,022,531

UNITED STATES PATENT OFFICE 2,022,531

FUSE FOR AN ELECTRICALLY HEATED DEVICE

Joy C. Adams, Bridgeport, Conn., assignor to General Electric Company, a corporation of New York Application June 21, 1933, Serial No. 676,877

4 Claims. (Cl. 200—142)

This invention relates to fuses, more particularly to fuses for electrically heated devices, such as percolators and the like, and it has for its object the provision of a fuse of this character which has an improved, and a relatively simple and inexpensive construction.

This invention contemplates the provision of a fuse controlling the heating circuit provided for electrically heated devices so as to open the heating circuit when the temperature of some part of the device, normally heated when the heating element is energized, rises to an abnormally high value. This may occur in percolators, and like vessels used to heat liquids, when the amount of liquid is less than a predetermined volume, such as when the volume of liquid has been depleted by evaporation, or if heat is applied to the percolator when there is no water in it.

The temperature of that part of the apparatus which is in thermal relation with the fuse should bear a certain relation to the temperature of that part of the device which is the weakest thermally so that the fuse will be caused to interrupt the heating circuit before this part of the device can be injured. Thus, for example, in percolators wherein the vessel containing the coffee and water is made of china, it is desirable that the fuse be caused to respond to the temperature of some part of the device whose temperature will quickly reflect an abnormal rise in temperature of the china body so that the fuse will be operated to open the heating circuit upon the occurrence of a predetermined maximum temperature in the china body and thereby prevent a dangerous temperature rise in the body.

In accordance with this invention, a fusible member is connected in the energizing circuit of the heating element provided for the heating device, and is arranged to respond directly to the temperature of one of the heating element terminals. It has been found by reason of this arrangement that when the heating element for any reason tends to overheat, such for example as when it is applying heat to a vessel and the quantity of the liquid in the vessel is depleted to a predetermined low value, the terminal immediately becomes heated and at once transfers heat to the fusible member. In other words, in the event of an abnormal temperature condition in the heating element, the temperature rise in the fusible member anticipates temperature rise in ony other part of the heating device. It will be understood that the fusing temperature of the fusible member will be selected to open the heating circuit before any part of the apparatus can be damaged. As previously indicated, the temperature of the terminal, i. e., the temperature of the heating element, at which the fusible member will function to open the heating circuit will be so selected that the heating element will be cut off before any part of the apparatus associated with the heating element can attain a dangerously high temperature.

In one form of this invention, the fuse comprises a body made of fusible metal arranged to have a threaded connection with the terminal. A tension spring attached to the body applies a force tending to strip the body from the terminal so that when the fusible body becomes overheated as a result of an abnormal temperature rise in the terminal, the body in fusing will be quickly removed from the terminal so as to quickly open the heating circuit.

The fusible body preferably will be formed of a material having a softening temperature considerably lower than its melting temperature, such as tin. This material has the advantage that it will soften somewhat before it melts, whereby the tension spring will quickly remove the fuse before it does melt.

For a more complete understanding of this invention, reference should be had to the accompanying drawing in which Fig. 1 is a vertical elevation, mainly in section, of an electrically heated percolator provided with a fuse arranged in accordance with this invention; Fig. 2 is an enlarged elevation of an electric heating unit assembly used in the percolator of Fig. 1 and illustrating the fuse arranged in accordance with this invention; and Fig. 3 is a bottom view of the assembly shown in Fig. 2.

Referring to the drawing, I have shown my invention in one form as applied to an electric coffee percolator comprising a suitable container 10. Secured centrally in the bottom of this container is an electric heating unit 11. Enclosing the heating unit 11 is a cup member 12 of a suitable percolator pump from which a tube 13 leads upwardly into the upper portion of the container where it terminates above the ground coffee container 14 carried by the tube 13 on its upper end. The container 14, as is well understood by those skilled in the art, is provided with a perforated cover member 15 through which the water issuing from the pump tube 13 is distributed over the coffee grounds in the container 14, and with a perforated bottom wall 15a through which the water which falls into the ground coffee container 14 and passes through the ground coffee enters into the container 10. As is also well understood by those skilled in the art, water flows from the container 10 into the pump cup 12 through a restricted opening (not shown) in the bottom of the cup, and after being heated is forced up by steam pressure through the tube 13 from which the water falls into the ground coffee container 14 and percolates through the ground coffee into the container 10.

The vessel 10 may be formed of any suitable material, but preferably will be made of china. This vessel, as shown, is mounted on a suitable hollow base 10a.

The heating unit 11 is embodied into a unitary structure which comprises a support 16 made of any suitable material, such as a suitable aluminum alloy. This support has a threaded cylindrical portion 17, at the lower end of which is arranged a flange 18. The threaded portion 17 is inserted through a suitable aperture 20 provided for it in the bottom wall of the vessel 10 so that the flange 18 seats against the outer surface of the bottom wall, in which position the support is secured by means of a nut or collar 21 threaded on the threaded cylindrical portion 17. The nut 21 is turned down firmly against the inner wall of the container, and suitable gaskets or washers 22 may be used to provide a water-tight joint.

While any suitable heating element 11 may be used, I prefer to use a heating unit of the sheathed wire type, such as described and claimed in United States patent to C. C. Abbott, No. 1,367,341, dated February 1, 1921. In brief, this heating unit comprises a sinuous resistance conductor 24 embedded in a suitable compacted powdered insulating material 25, such as magnesium oxide, and encased in a metallic sheath 26. The electric heating unit 11 is passed through the supporting member 16 and at its ends is provided with terminals 27 which are electrically and mechanically connected with the ends of the resistance element 24 in any suitable manner (not shown).

The heating element 11 is electrically connected with a suitable source of electrical supply by means of a pair of terminal pins 30 which are arranged to receive a suitable electric connector (not shown) provided with the usual twin conductor supply cord.

One of these pins 30, the lowermost shown in Fig. 3, is directly connected electrically and mechanically with the corresponding terminal 27 of the heating unit 11, and for this purpose, the pin 30 at its inner end is provided with a suitable aperture through which the terminal 27 projects, and to which terminal the pin is mechanically and electrically connected by peening over the end of the terminal, as clearly shown in Fig. 3. Interposed between the peen and the terminal 30 is a suitable metallic washer 31. The terminal 30 is electrically insulated from the adjacent end wall of the sheath 26 by means of a sheet 32 formed of insulating material, such as mica. This sheet 32, as shown in Fig. 3, bridges the two ends of the heating element 11, the mica sheet being provided with a pair of apertures (not shown) for receiving the two terminals 27.

The upper terminal pin 30, as viewed in Fig. 3, is electrically connected with the remaining terminal 27 through a suitable fuse 33. This fuse 33, as shown in Fig. 2, is provided with a cylindrical body portion which is provided with an internal thread 34. This body portion is arranged to be threaded on the associated terminal 27 which is provided with a thread 34a arranged to receive the internal thread 34 in the cylindrical body member. By reason of this construction, in order to apply the fuse it is merely necessary to turn it inwardly upon the threaded terminal.

The fuse 33 is electrically connected to the upper terminal pin 30 by means of a suitable spring member 35. This terminal pin 30, as shown in Fig. 3, has a hook-shaped portion 36 which is supported by means of protuberances 37 on the bottom of the supporting member 16. These protuberances are in substantial alignment with the upper terminal 27, as shown in Fig. 3, and the central portion of the member 36, as shown, is formed in a substantial U-shape, the two legs of which embrace the upper terminal pin 27. The portion 36 is secured to the protuberances by means of screws 38, the portion 36 being provided with suitable apertures for receiving these screws. The portion 36 is electrically insulated from the protuberances by means of insulating washers 40 formed of any suitable electrically insulating material, such as mica, and from the screws 38 by means of collars or washers 41 formed of any suitable electrically insulating material, such as lava.

The plate 36 at its inner end terminates in a portion 43 which is arranged substantially parallel with the center line of the two terminals 27, that is, substantially parallel with the center line of the mica bridging member 32. The end of this portion 43 carries the electrically conducting spring member 35.

This spring member 35, as shown, has a curved end 35a rigidly secured in any suitable manner, as by means of a rivet, to the portion 43 of the terminal pin. The other end of the spring member 35 is electrically and mechanically connected to the fuse body 33. As shown, this body 33 adjacent one end is provided with a reduced portion 44 which terminates in a head 45. The spring member 35 is provided with a notch 46 which is received in this reduced portion 44 so as to secure the spring to the fuse.

It will be understood that during the operation of the device, when the temperature of the fusible body 33 reaches the softening point of the body, the spring 35 will function to strip the body from the terminal and thereby break the electrical supply circuit to the heating element 11.

It will be observed that the fusible body 33 will respond thermally to the temperature of the terminal 27 to which it is attached. It will be understood that the temperature of the terminals of the heating element 11 rises immediately with temperature rise in the heating element itself, and before the temperature of other parts of the apparatus can follow the temperature rise in the heating element. Consequently, by properly selecting the fusing temperature of the body 33, the fuse will function to open the heating circuit before any part of the apparatus can be damaged.

Thus, the fusible body 33 will be made of a material having a softening temperature which will be sufficiently low to break the circuit of the heating element 11 before any part of the percolator can be permanently damaged by excessive temperature rise. I have found that pure tin is a very suitable material from which to make the fusible body 33. This substance has a softening temperature somewhat lower than the temperature at which the material will melt; thus it has a softening temperature of approximately 400–425° F., whereas its melting temperature is approximately 449° F. This characteristic of tin is of advantage because the tin body 33 will become sufficiently soft before it melts to permit the spring member 35 to strip it from its terminal. It will be understood that this softening temperature of 400°–425° F. of tin is so low that the fuse will function to break the circuit to the heating element 11, in the event of an abnormal temperature condition, before the china body 10 or any other part of the percolator can attain such a temperature that it would become permanently damaged.

It will be understood that after the fuse has functioned to break the circuit to the heating element, the fuse can be replaced by screwing the body 33 of another similar fuse onto the terminal 27 and then moving the spring member 35 laterally, in a clockwise direction, as viewed in Fig. 3, so as to bring the mouth of the notch 46 into alignment with the reduced section 44, after which the spring will be moved in a counterclockwise direction so as to bring the notch into the reduced section.

The reduced section 44 not only functions to secure the spring member 35 to the fuse, but also reduces the heat flow from the fuse body 33 to the spring member 35. This is desirable because it results in a more pronounced rise in temperature in the fuse body itself upon the occurrence of an abnormal temperature rise in the terminal 27 than if a free flow of heat were permitted from the fuse to the spring.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In an electrically heated vessel and the like provided with a heating unit having a terminal, a fuse comprising a fusible member controlling the energizing circuit for said heating unit having a threaded connection with said terminal and a spring connected with said fusible member arranged to apply to it a force tending to strip it from said terminal so that said fusible member is removed when the temperature of said terminal, and hence of said fusible member, attains a predetermined value to thereby open said energizing circuit, said fusible member having a reduced section between said terminal and said spring arranged to reduce the flow of heat from said terminal to said spring.

2. In an electrically heated vessel and the like provided with a heating unit having a terminal, a fuse comprising a fusible body controlling the energizing circuit for said heating unit having a hollow cylindrical portion at one end and a solid portion of reduced section terminating in an abutment at the other end, said hollow portion having an internal thread arranged to be threaded on said terminal so that the temperature of said fusible body is substantially the same as that of said terminal and a tension spring connected in the energizing circuit of said heating unit having one end anchored and its other end fitted in said reduced section to bear on said abutment and thereby apply a force to said fusible body tending to strip it from said terminal, whereby when said fusible member attains a predetermined temperature said spring functions to remove said fusible body from said terminal and thereby interrupt said energizing circuit.

3. In an electrically heated vessel and the like provided with an electrical heating element having a terminal related to the heating element in such manner that it has substantially the same temperature as said element, a fusible member secured to said terminal in direct thermal relation with it and a spring connected with said fusible member at a point remote from said terminal, applying a force in a direction such that it tends to strip said member from said terminal, said fusible member arranged to reduce said flow of heat through said member from said terminal to said spring.

4. In an electrically heated vessel and the like provided with a heating unit, a fuse comprising a fusible member controlling the energizing circuit for said heating unit having a cylindrical portion at one end and a portion of reduced section terminating in an abutment at the other end, means for securing said cylindrical portion to said heating unit so that the temperature of said fusible member is substantially the same as that of said unit and a tension spring having one end anchored and its other end fitted in said reduced section of said fusible member so as to bear on said abutment and thereby apply a force to said fusible member tending to remove it from said heating unit, whereby when said fusible member attains a predetermined temperature said spring functions to remove said fusible member and thereby interrupt said energizing circuit.

JOY C. ADAMS.